Patented Dec. 12, 1939

2,182,991

UNITED STATES PATENT OFFICE 2,182,991

PROCESS FOR PREPARING POLYESTERS

Wilbur A. Lazier, Wyckwood, Del., assignor to E. I. du Pont de Nemours & Company, Wilmington, Del., a corporation of Delaware No Drawing. Application December 22, 1937, Serial No. 181,204

7 Claims. (Cl. 260—495)

This invention relates to catalytic processes and more particularly it relates to processes for the preparation of polymeric esters. Specifically the invention relates to a dehydrogenation process whereby polymethylene glycols are converted into polymeric esters.

This application is a continuation-in-part of my copending application Serial No. 713,922, filed March 3, 1934.

Catalytic dehydrogenation processes have been used for many years for the preparation of aldehydes from primary alcohols and for the preparation of ketones from secondary alcohols. More recently it has been found that if the dehydrogenation of simple primary alcohols is carried out under pressure, esters are formed together with aldehydes and other products. Heretofore, polymeric esters have been prepared by esterification processes operated on either a mixture of polybasic acids and polyhydric alcohols or on hydroxy acids containing dualist functions. Thus polymeric esters have been prepared from hexamethylene glycol and adipic acid and from omega-hydroxy caproic acid.

I have now found that if long-chain primary polymethylene glycols having at least six methylene groups are heated in the presence of active dehydrogenation catalysts, hydrogen is evolved as might be expected, but the product is neither the completely dehydrogenated dialdehyde nor the partly dehydrogenated hydroxy aldehyde; but instead the mixture is found to have developed acid characteristics as indicated by the development of and rise in a saponification value. The acid is not present in the form of free carboxyl groups, but esterified with the unchanged hydroxyl groups to give a material comprised of polylactones and polyesters. The fact that the esters are polymeric in character is evidenced by the increase in viscosity, which in some cases may rise so high as to give the polymer solid rubbery characteristics at room temperature. There is also a corresponding decrease in the solubility of the dehydrogenation residue in the usual organic solvents.

This invention therefore has as an object the conversion of polymethylene glycols having primary hydroxyl groups into polymeric esters. Another object is to provide a new process for the preparation of such polymeric esters. Other objects will appear hereinafter.

These objects are accomplished by heating in the presence of a dehydrogenation catalyst, preferably a highly active chromite dehydrogenation catalyst, a polymethylene glycol having primary hydroxyl groups and having at least six methylene groups interposed between the hydroxyl groups.

The preferred embodiments of this invention are given in detail in the following selected examples.

Fifteen hundred grams of copper nitrate dissolved in 4 liters of water was mixed with a solution containing 1000 grams of ammonium chromate in an equal volume of water. Ammonium hydroxide was added to neutralize the acidity developed during precipitation of the copper ammonium chromate. The precipitate was filtered, dried, and ignited at a temperature of 400° C. after which it was extracted twice with dilute acetic acid. The resulting copper chromite powder was employed for dehydrogenation without further treatment.

Eighty-one grams of hexamethylene glycol was mixed with 8 grams of copper chromite prepared as described above and heated to 200° to 235° C. under an open reflux condenser for 5.3 hours. Evolution of hydrogen occurred to an extent that indicated a 55% conversion to the corresponding dialdehyde. Examination of the product, however, revealed the formation of an undistillable lactone of ω-hydroxy hexanoic acid as the major product.

Under similar conditions decamethylene glycol was dehydrogenated to a tough rubber-like polymeric ester.

Although the experiments outlined above were carried out in the presence of copper chromite as the catalyst, other well known dehydrogenation catalysts such as finely divided cobalt, nickel, or silver, and the oxides and sub-oxides of these may be used, either supported or unsupported on carriers. This invention also contemplates the use of pressures varying from those below atmospheric which may assist in the rapid removal of hydrogen to pressures appreciably higher than atmospheric pressure to assist in the condensation of the primary products of reaction. The temperatures are those usually employed for catalytic dehydrogenation. The lower limit is dependent on the activity of the particular catalyst and for copper chromite is about 90° C. The upper limit is fixed by the tendency for the organic matter undergoing reaction to decompose in an uncontrolled manner. For hexamethylene glycol at atmospheric pressure this limiting temperature may be in the proximity of 300° C.

The processes of this invention are applicable to a wide variety of polymethylene glycols. For ester formation it is essential however that at least two of the hydroxyl groups be primary alcohol groups. It is also essential that the chain length shall not be so short as to induce excessive cyclization of the compound with the formation of monomeric cyclic ethers, acetals, lactones and the like. I have found that the processes of this invention give the best results if practised on polymethylene glycols having at least six methylene groups interposed between the two hydroxyl groups. Examples of this type on which the process is operative are hexamethylene glycol, octamethylene glycol, decamethylene glycol, and higher glycols having up to eighteen methylene groups.

The polyesters which form the subject matter of this invention, after removal of the catalyst, may be usefully employed as such as plasticizers and constituents of coating compositions or may be converted through further processing into super polymers of enhanced value for use in films, sheet material, molding compositions, fibers, coating compositions and the like.

Since many apparently and widely different embodiments of this invention may be made without departing from the spirit and scope thereof, it is to be understood that I do not limit myself to the specific embodiment thereof except as defined in the following claims.

I claim:

1. The process for preparing polymeric esters which comprises heating in the presence of a dehydrogenation catalyst a polymethylene glycol having at least two primary hydroxyl groups and having at least six methylene groups interposed between the hydroxyl groups.

2. The process of claim 1 characterized in that the temperature of heating is between 90° C. and 300° C.

3. The process of claim 1 characterized in that the glycol is a long-chain glycol having from six to eighteen carbon atoms and at least six methylene groups interposed between two hydroxyl groups.

4. The process of claim 1 characterized in that the catalyst is copper chromite.

5. The process of claim 1 characterized in that the glycol is hexamethylene glycol.

6. The process of claim 1 characterized in that the glycol is decamethylene glycol.

7. The process of dehydrogenating a long-chain glycol having at least six methylene groups interposed between two primary hydroxyl groups which comprises heating the said glycol in contact with a dehydrogenation catalyst in the liquid phase at such a temperature that hydrogen is evolved and until the said glycol is substantially converted to a mass of polymeric ester.

WILBUR A. LAZIER.